United States Patent [19]
Santi

[11] Patent Number: 6,077,063
[45] Date of Patent: Jun. 20, 2000

[54] TOOL FOR MAKING A COMPOSITE GEAR

[75] Inventor: John D. Santi, West Allis, Wis.

[73] Assignee: Briggs & Stratton Corporation, Milwaukee, Wis.

[21] Appl. No.: 09/114,543

[22] Filed: Jul. 13, 1998

Related U.S. Application Data

[62] Division of application No. 08/941,217, Oct. 1, 1997, Pat. No. 5,852,951, which is a continuation of application No. 08/635,298, Apr. 19, 1996, abandoned, which is a continuation-in-part of application No. 08/317,323, Oct. 4, 1994, abandoned.

[51] Int. Cl.$^7$ .............................. B23B 19/00; B23B 23/02
[52] U.S. Cl. ...................... 425/116; 425/125; 425/129.1; 264/275
[58] Field of Search .................................. 425/116, 117, 425/125, 129.1; 264/273, 275

[56] References Cited

U.S. PATENT DOCUMENTS

| | | | |
|---|---|---|---|
| 2,720,119 | 10/1955 | Sherman | 74/460 |
| 3,469,468 | 9/1969 | Cozzarin et al. | 74/243 |
| 3,504,562 | 4/1970 | Hirych | 74/243 |
| 3,557,424 | 1/1971 | Heathwaite et al. | 29/159.2 |
| 3,590,456 | 7/1971 | Seaman | 29/159.2 |
| 3,591,909 | 7/1971 | Bebbington, Jr. | 29/159.2 |
| 3,602,058 | 8/1971 | Beddoe | 74/461 |
| 3,605,513 | 9/1971 | Sugimoto | 74/243 |
| 3,719,103 | 3/1973 | Streander | 74/445 |
| 3,730,009 | 5/1973 | Mead et al. | 74/243 |
| 3,733,921 | 5/1973 | Carveth | 74/439 |
| 4,174,643 | 11/1979 | Tsukamoto | 74/443 |
| 4,332,574 | 6/1982 | Aoyama et al. | 474/161 |
| 4,472,164 | 9/1984 | Pusch et al. | 474/161 |
| 4,589,860 | 5/1986 | Bradenstein et al. | 474/161 |
| 4,696,200 | 9/1987 | Pezzoli | 74/434 |
| 4,827,589 | 5/1989 | Friedrichs . | |
| 4,942,776 | 7/1990 | Quirk et al. | 74/61 |
| 5,307,705 | 5/1994 | Fenelon | 74/443 |
| 5,438,732 | 8/1995 | Engels et al. . | |

FOREIGN PATENT DOCUMENTS

| | | |
|---|---|---|
| 1030239 | 6/1953 | France . |
| 1289508 | 8/1962 | France . |
| 2712719 | 9/1978 | Germany . |
| 29 01 816 A1 | 7/1980 | Germany . |
| 4103690 A1 | 8/1992 | Germany . |
| 59-129652 | 7/1984 | Japan . |
| 2-66363 | 3/1990 | Japan . |
| 7708864 | 12/1976 | Netherlands . |
| 376324 | 5/1964 | Switzerland . |
| 533261 | 3/1973 | Switzerland . |
| 418145 | 10/1934 | United Kingdom . |
| 989898 | 4/1962 | United Kingdom . |
| 1240505 | 7/1971 | United Kingdom . |

*Primary Examiner*—P. W. Echols
*Attorney, Agent, or Firm*—Michael Best & Friedrich LLP

[57] ABSTRACT

A composite gear includes one or more metal stamped plates, and two thermoplastic layers disposed on opposite sides of the plates. Apertures are provided in the stamped metal plates so that the molten thermoplastic material may flow through the apertures and anchor the two thermoplastic layers to each other as well as to the metal plates. The composite gear has composite gear teeth which consist of one or more metal gear teeth portions sandwiched between two thermoplastic gear teeth portions. The thermoplastic gear teeth portions extend outwardly from the metal gear teeth portions so that the thermoplastic teeth portions absorb loads under normal operating conditions. Under abnormal conditions such as when an abrupt stop occurs, the thermoplastic portions of the gear teeth are compressed and the higher torque forces resulting from the abnormal condition are absorbed by the metal gear teeth portions. Unique tooling and manufacturing methods are also described to enable the composite gear to be made without overmolding the metal gear teeth portions.

8 Claims, 10 Drawing Sheets

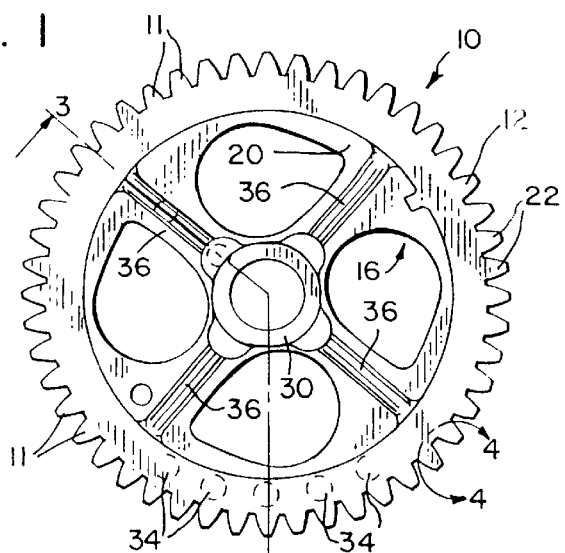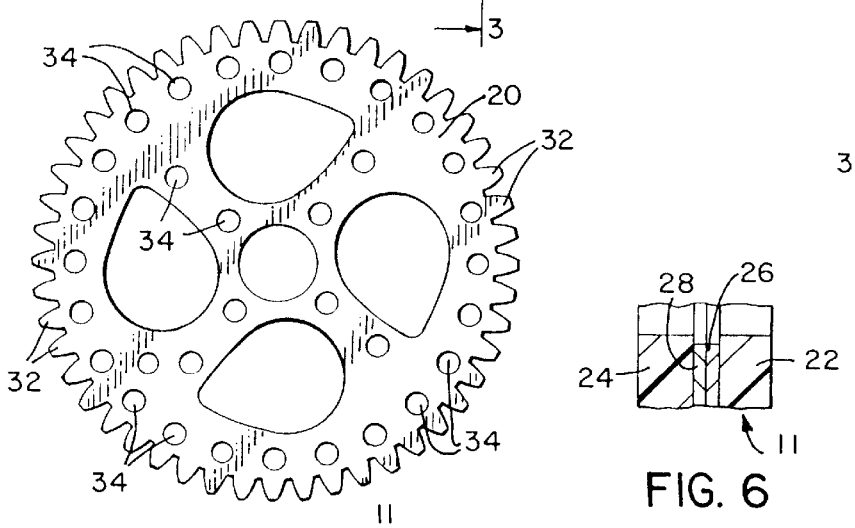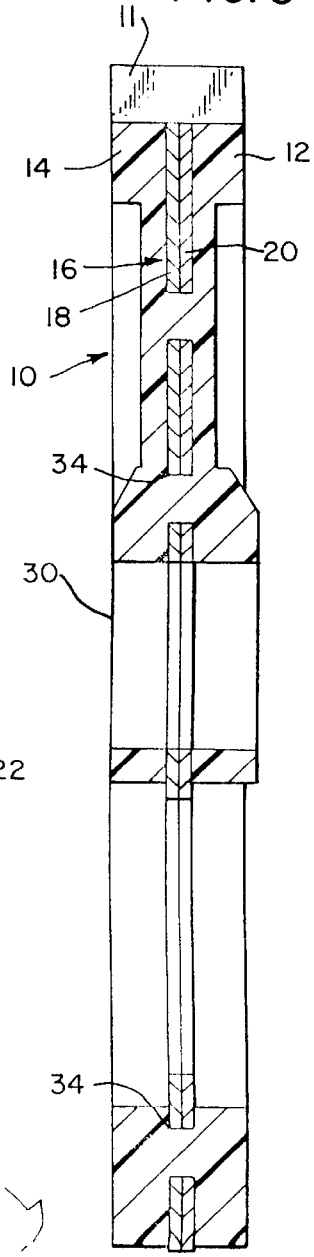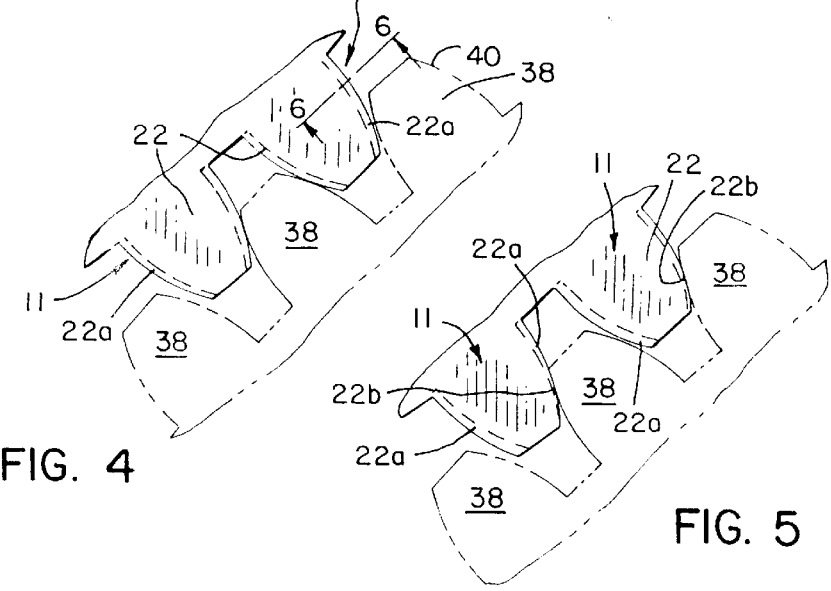

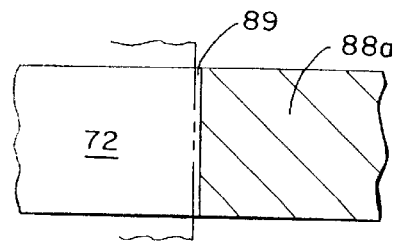
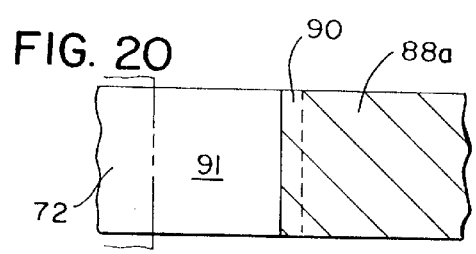
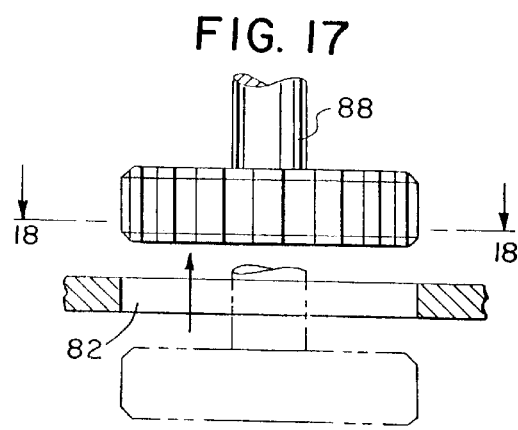
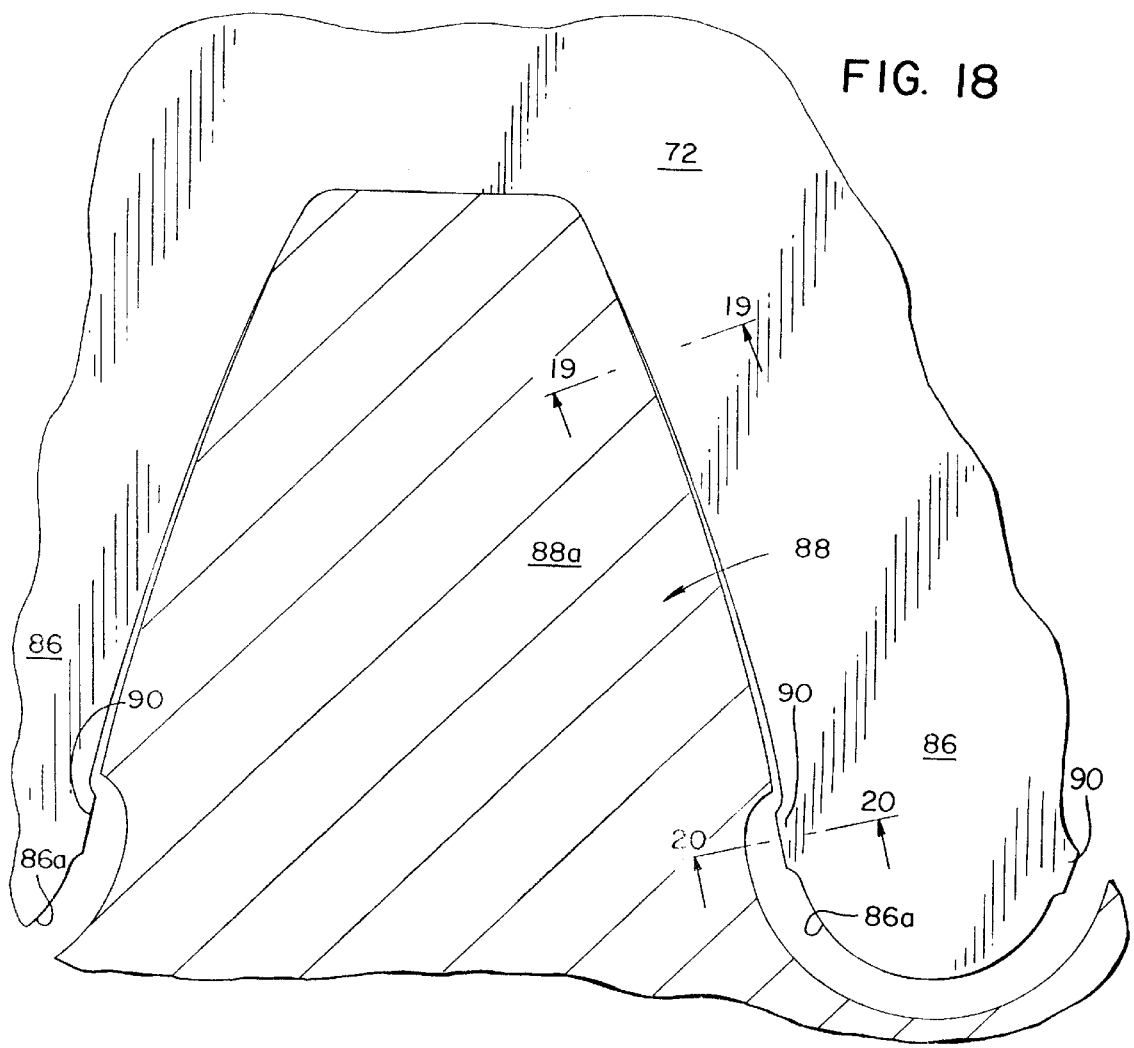

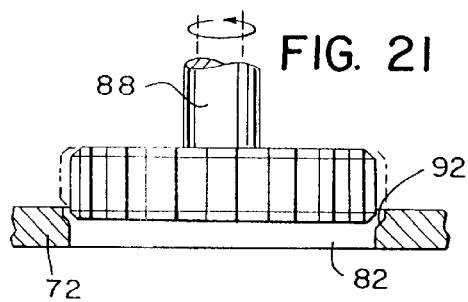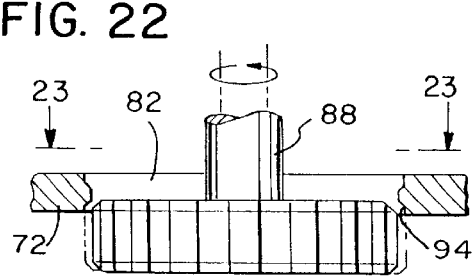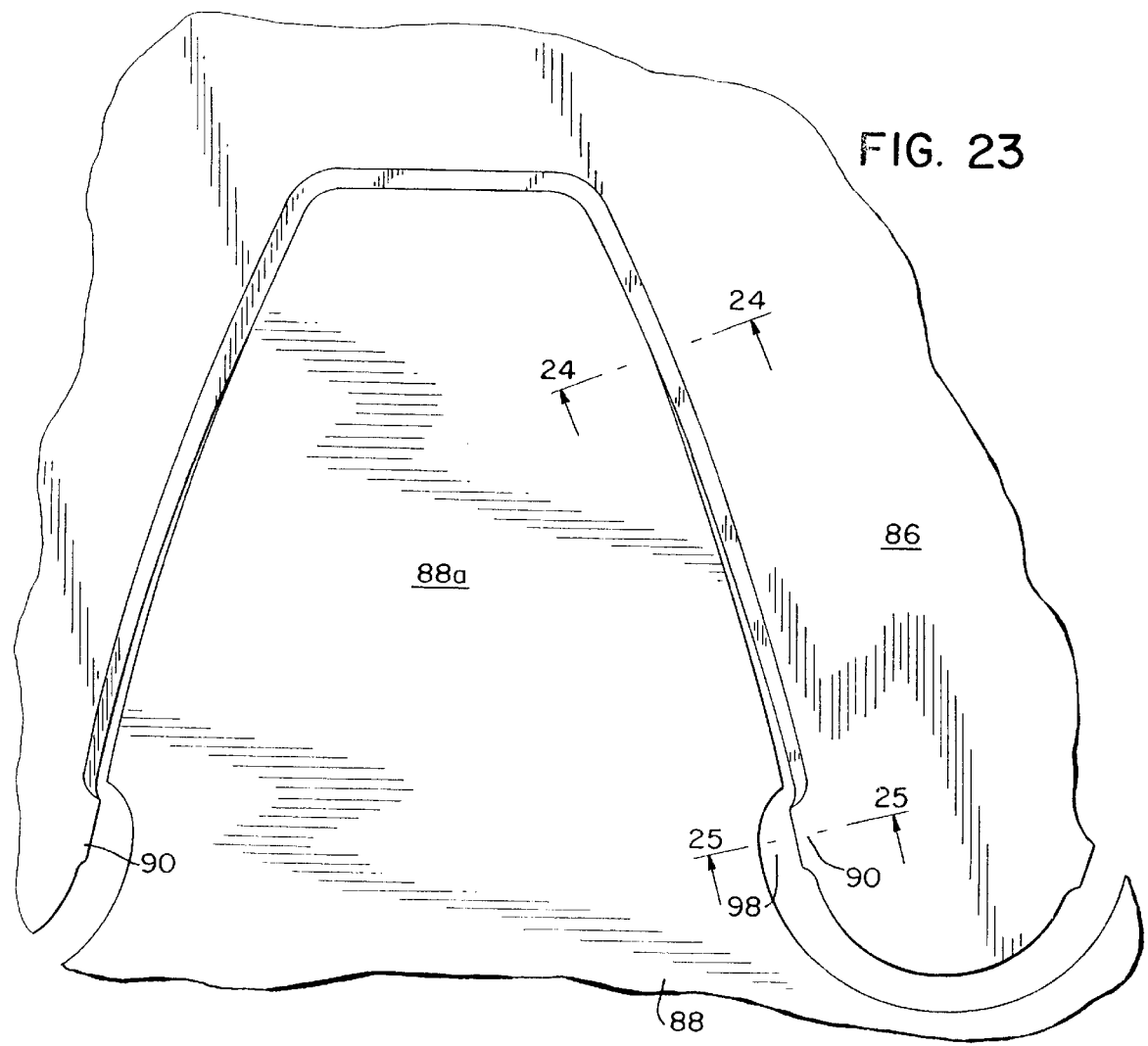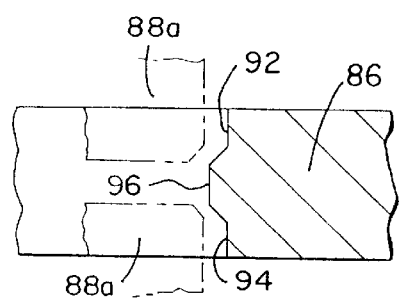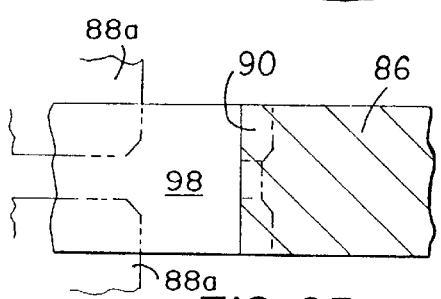

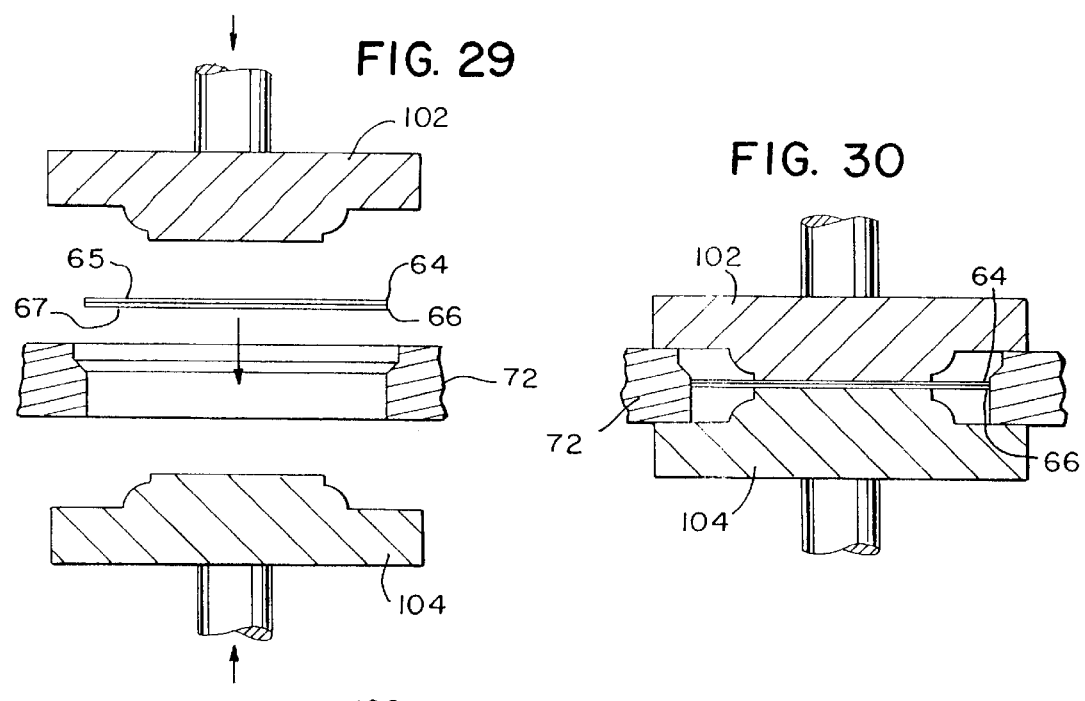
FIG. 29
FIG. 30
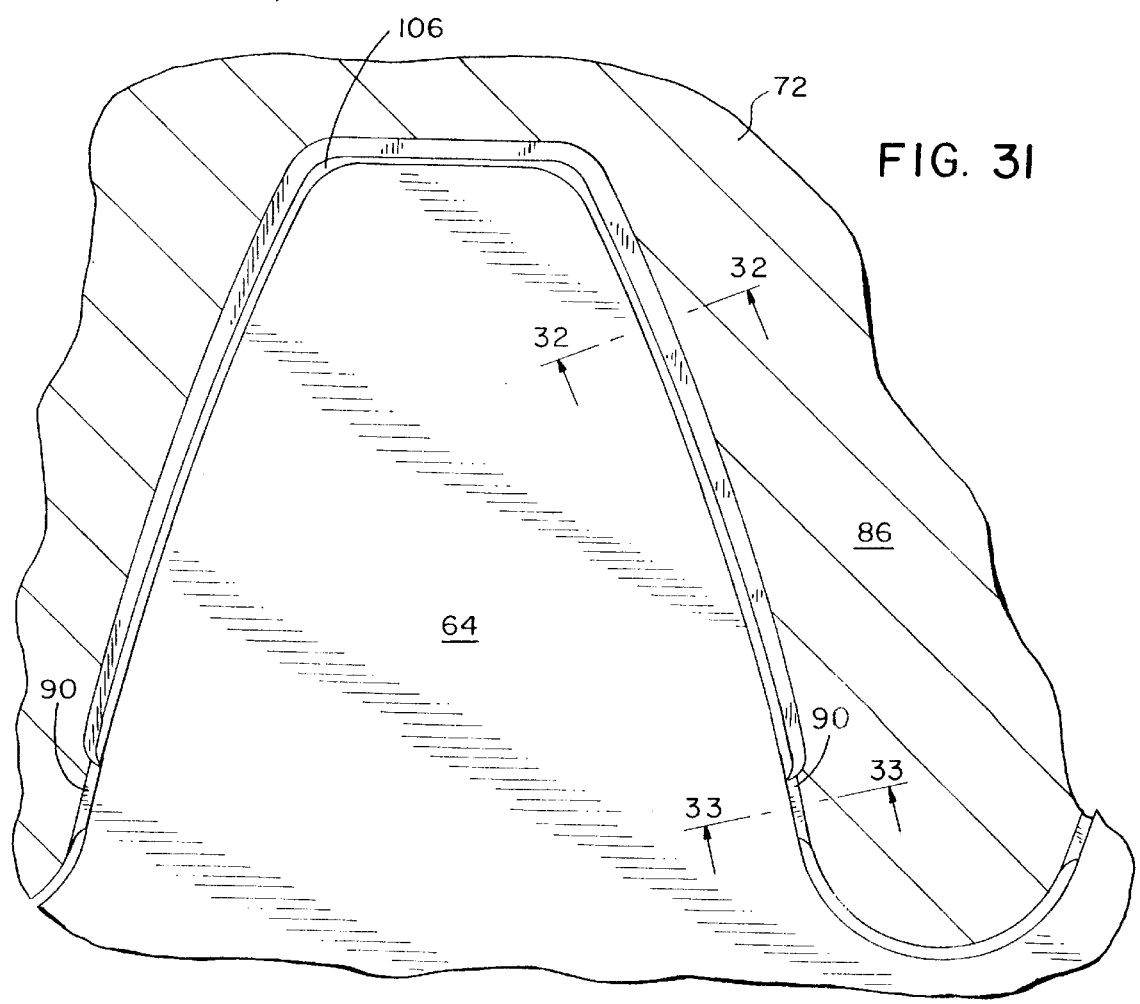
FIG. 31

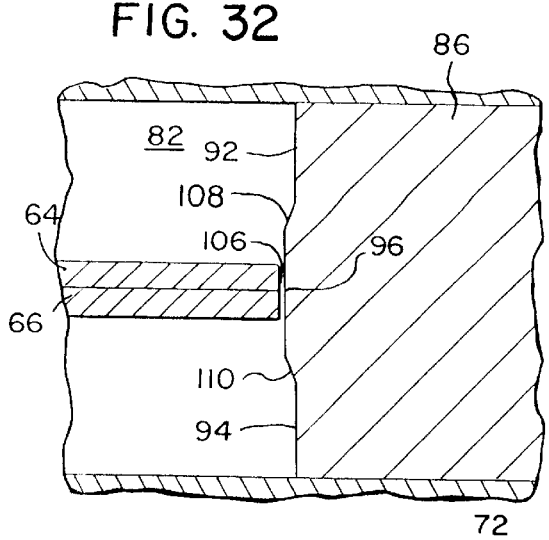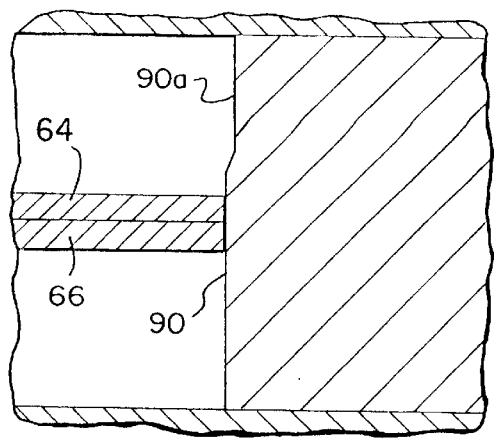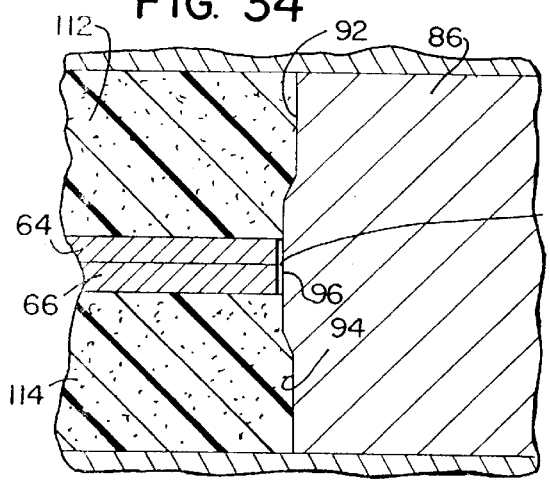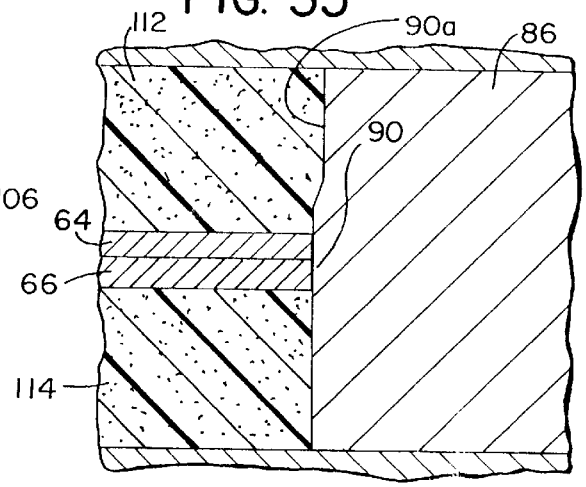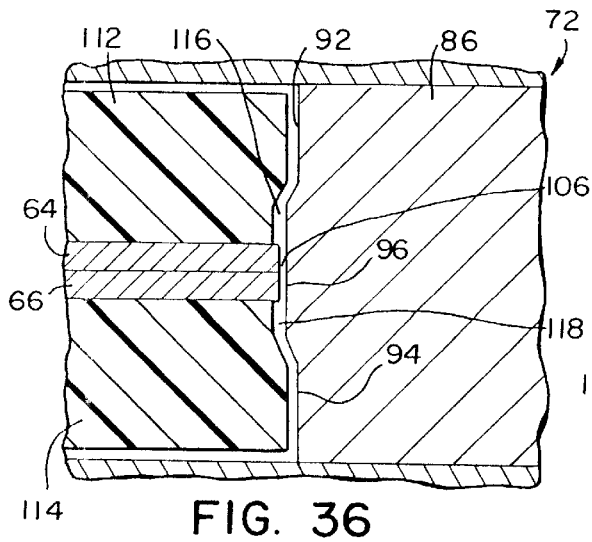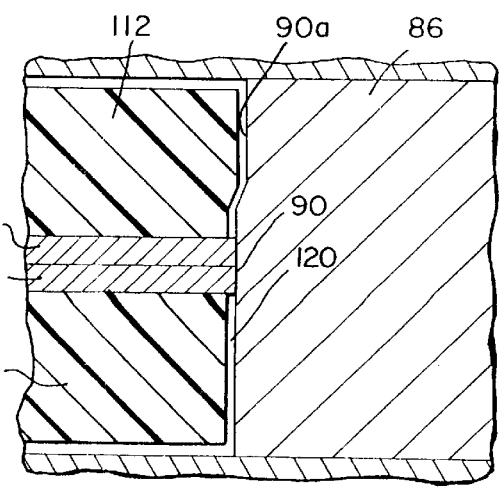

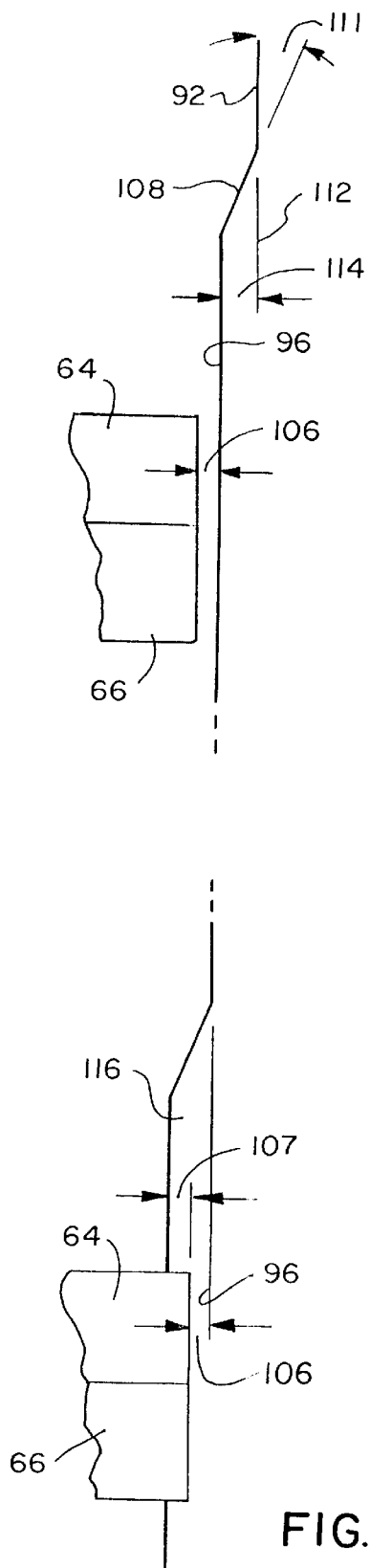
FIG. 32A
FIG. 36A
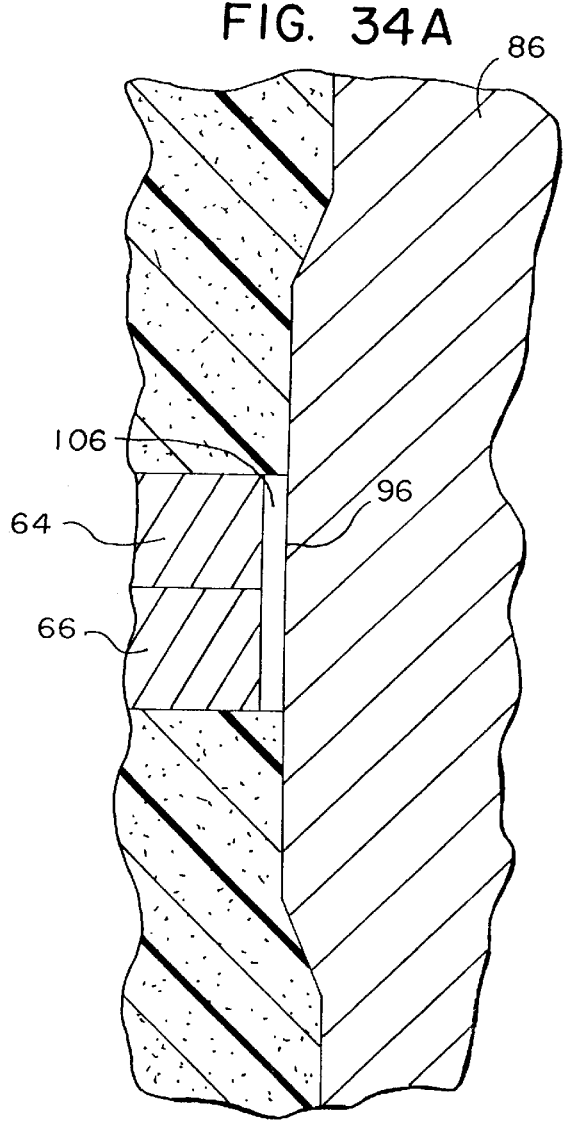
FIG. 34A

TOOL FOR MAKING A COMPOSITE GEAR

This application is a division of U.S. patent application Ser. No. 08/941,217 filed Oct. 1, 1997, now U.S. Pat. No. 5,852,951, which was a continuation of U.S. patent application Ser. No. 08/635,298 filed Apr. 19, 1996, now abandoned, which was a continuation-in-part of U.S. patent application Ser. No. 08/317,323 filed Oct. 4, 1994, now abandoned.

BACKGROUND OF THE INVENTION

This invention relates to gears. More particularly, this invention relates to composite gears made from a rigid material such as metal as well as from a thermoplastic material.

Gears made from a rigid material such as metal or metal alloys are well known and are used in many applications. Such gears may withstand high torque load forces, but have a significant shortcoming in that they generate a great deal of noise when they mesh with other metal gears.

Gears made from a thermoplastic material are also known and have been used to reduce the noise generated by metal gears. However, thermoplastic gears have significant disadvantages, in that they cannot withstand high torque load forces without damaging their gear teeth, and are more susceptible to wear than metal gears.

To solve the respective problems of metal and thermoplastic gears, several attempts have been made to manufacture composite gears having some metal components and some thermoplastic components. U.S. Pat. No. 3,719,103 issued Mar. 6, 1973 to Streander discloses one such attempt in which a thermoplastic panel is sandwiched between two rigid steel plates, with the assembly being thereafter bolted together. One purpose of the gear in U.S. Pat. No. 3,719,103 is to increase the torque rating of the gear under normal load conditions as compared to gears having teeth which are made from a thermoplastic material alone. The increased torque rating is achieved by having the steel plates control the bending of the plastic material since the plastic is sandwiched between the two steel plates. The torque rating is increased so that higher loads may be borne under normal conditions.

Another object of the design in U.S. Pat. No. 3,719,103 is to reduce gear noise. Although some noise reduction is achieved in the patented design, significant noise will still be generated by the gear since the steel plates limit the bending of the plastic teeth.

SUMMARY OF THE INVENTION

A composite gear is disclosed which significantly reduces gear noise when compared to prior art composite gears, while still allowing high torque forces to be absorbed without damage under emergency conditions.

The composite gear according to the present invention includes a rigid body portion, preferably comprised of a plurality of metal plates having gear teeth on the periphery thereof. A first layer of a thermoplastic material such as nylon is disposed on a first side of the rigid body portion, and a second layer of the thermoplastic material is disposed on an opposite, second side of the body portion. The first and second layers may have uniform or non-uniform thicknesses. Both the first layer and the second layer have thermoplastic gear teeth portions on their respective peripheries which are adjacent the body portion gear teeth. In one embodiment, the body portion includes a plurality of apertures through which the molten thermoplastic material flows so that the two layers of thermoplastic material are anchored to the rigid body portion and to each other when the thermoplastic material solidifies. The rigid laminations which comprise the body portion are preferably thin, stamped, steel plates to reduce the cost of manufacture.

The thermoplastic teeth portions of the first and second thermoplastic layers extend outwardly from the rigid gear teeth of the body portion in both circumferential directions as well as in the radial direction. This arrangement enables the teeth of the mating gear to engage the thermoplastic portions of the composite gear teeth under normal load conditions.

The thermoplastic material is selected such that the gear teeth portions of the first and second layers mesh with the gear teeth of the mating gear under normal operating conditions. Under emergency conditions, such as when the rotation of the gear is abruptly stopped, the thermoplastic gear teeth portions are compressed by the teeth of the mating gear so that the higher than normal torque forces are borne by the rigid teeth of the body portion.

In a second embodiment of the present invention, both thermoplastic gear teeth portions of each composite tooth extend outwardly in the axial direction away from their respective layers of thermoplastic material. This configuration increases the bending of the thermoplastic gear teeth portions when unusual torque forces are applied to the composite gear teeth.

The present invention allows the thermoplastic gear teeth portions to bend and compress under normal conditions, thereby substantially reducing gear noise when compared to prior art composite gears. Under unusual, high load conditions, the thermoplastic portions of the gear teeth are compressed such that the high load forces are borne by the rigid gear teeth portions.

The present invention also includes unique tooling and manufacturing methods to make the composite gear. To manufacture the composite gear such that the thermoplastic gear teeth portions extend circumferentially and radially outward from the rigid gear teeth of the body portion, it is necessary to control the flow of the thermoplastic material during the molding process so that the thermoplastic material does not overmold the rigid gear teeth portions. To prevent such overmolding, it is important that the rigid body portion be precisely centered within the tool, and that the distance between the rigid gear teeth portions and the tool be limited. The present invention provides the tool and a method of manufacturing the tool, so that the composite gear may be made without overmolding the rigid gear teeth portions. The present invention also includes a unique method of manufacturing the composite gear so that the rigid gear teeth portions are not overmolded with the thermoplastic material.

It is a feature and advantage of the present invention to reduce gear noise in internal combustion engines and other devices.

It is yet another feature and advantage of the present invention to provide a composite gear with substantially all the benefits of thermoplastic gears yet with additional strength under abnormal conditions.

These and other features and advantages of the present invention will be apparent to those skilled in the art from the following detailed description of the preferred embodiment and the drawings, in which:

BRIEF DESCRIPTION OF THE DRAWINGS

FIG. 1 is a side view of a composite gear according to a first embodiment of the present invention.

FIG. 2 is a side view of a metal lamination used in the body of the composite gear of FIG. 1.

FIG. 3 is a cross-sectional end view of a gear according to the first embodiment of the present invention, taken along line 3—3 of FIG. 1.

FIG. 4 is aside view depicting composite gear teeth according to the present invention meshing with the teeth of a mating gear during normal operation, taken along line 4—4 of FIG. 1.

FIG. 5 depicts the composite gear teeth of the present invention meshing with mating gear teeth during an abnormal condition such as an abrupt stop.

FIG. 6 is a cross-sectional view of a single composite gear tooth according to the first embodiment of the present invention, taken along line 6—6 of FIG. 4.

FIGS. 13 through 28 depict the process of manufacturing a tool used to make the composite gear.

FIG. 13 is a plan view of a plate with an aperture therein.

FIG. 14 is a side schematic view depicting a wire disposed in the aperture of FIG. 13 and an electric discharge machine apparatus.

FIG. 15 is a plan view of the plate depicting the tool cavity after an electric discharge machining process.

FIG. 16 depicts a graphite electrode passing through the tool cavity of FIG. 15.

FIG. 17 depicts the graphite electrode of FIG. 16 passing through the tool cavity in the reverse direction.

FIG. 18 is a top exploded view of a tool and a portion of the graphite electrode.

FIG. 19 is a cross-sectional view depicting a small gap between the tool and the electrode, taken along line 19—19 of FIG. 18.

FIG. 20 is a side cross-sectional view depicting a relatively large gap between the graphite electrode and the tool, taken along line 20—20 of FIG. 18.

FIG. 21 is a side view depicting the graphite electrode being orbited in a first portion of the tool cavity to create a first side section of the tool teeth.

FIG. 22 is a side view depicting the graphite electrode being orbited in a second section of the tool cavity to create a second side section of the tool teeth.

FIG. 23 is an exploded view depicting the graphite electrode and the tool, taken along line 23—23 of FIG. 22.

FIG. 24 is a cross-sectional side view depicting the position of the electrode in FIGS. 21 and 22 with respect to the tool, taken along line 24—24 of FIG. 23.

FIG. 25 is a cross-sectional side view depicting the position of the electrode in FIGS. 21 and 22 with respect to the tool, taken along line 25—25 of FIG. 23.

FIG. 26 is a side view of a second graphite electrode used to taper the centering protrusions of the tool.

FIG. 27 is an exploded top view of the second electrode and the tool, taken along line 27—27 of FIG. 26.

FIG. 28 is a side cross-sectional view of the second electrode and the tool, taken along line 28—28 of FIG. 27.

FIGS. 29 through 40 relate to the methods used to manufacture the composite gear of the present invention.

FIG. 29 is a side view of the mold components according to a first method when the mold is in the open position.

FIG. 30 is a side view of the mold of FIG. 29 when the mold is closed.

FIG. 31 is an exploded top view of a rigid gear tooth portion-tool combination when the mold is closed.

FIG. 32 is a side cross-sectional view of the rigid tooth portion and the tool, taken along line 3232 of FIG. 31.

FIG. 32A is a schematic diagram depicting the distances between the composite gear components and the tool in FIG. 32.

FIG. 33 is a side cross-sectional view of the rigid gear tooth portion-tool combination, taken along line 33—33 of FIG. 31.

FIG. 34 is a side cross-sectional view depicting the molten thermoplastic material in the areas away from the centering protrusions.

FIG. 34A is an exploded view of a portion of FIG. 34.

FIG. 35 is a side cross-sectional view of the molten thermoplastic material in an area near a centering protrusion.

FIG. 36 is a side cross-sectional view depicting the thermoplastic material after it has shrunk away from the tool, in an area away from the centering protrusion.

FIG. 36A is a schematic diagram depicting the distances between the composite gear components and the tool after the thermoplastic material has shrunk.

FIG. 37 is a side cross-sectional view depicting the thermoplastic material after it has shrunk away from the tool, in an area near a centering protrusion.

FIG. 38 depicts a mold in an open position that may be used according to a second embodiment of the method.

FIG. 39 depicts the mold in a closed position used with the second embodiment of the method.

FIG. 40 is an exploded top view of the rigid gear tooth portion and tool combination according to the second embodiment of the method.

DETAILED DESCRIPTION OF THE INVENTION

Figure 7:
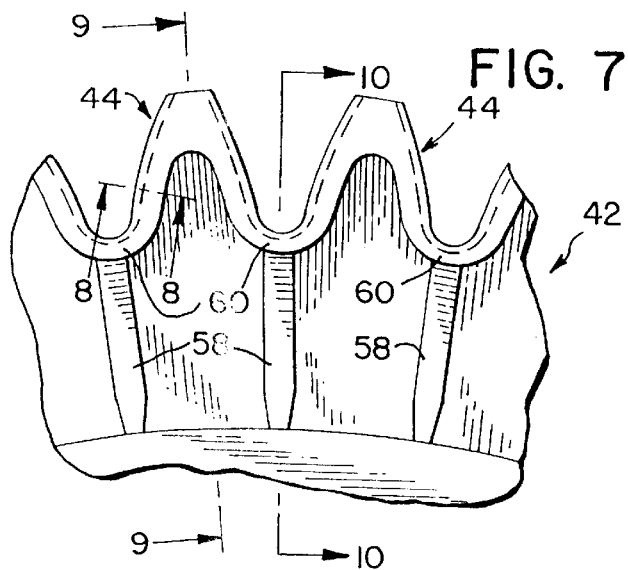
FIG. 7 is an exploded view of a second embodiment of the present invention.

FIGS. 1 and 3 depict a first embodiment of the composite gear according to the present invention. In FIGS. 1 and 3, composite gear 10 includes a first layer 12 of a thermoplastic material, a second layer 14 of a thermoplastic material, and a body portion 16 which preferably consists of two stamped, steel plates 18 and 20. Layers 12 and 14 may have uniform or non-uniform thicknesses.

Each of thermoplastic layers 12 and 14 has a plurality of gear teeth portions thereon. A complete, composite gear tooth 11 is depicted in FIG. 6. In FIG. 6, composite gear tooth 11 is comprised of a thermoplastic gear tooth portion 22 formed on the periphery of first layer 12, a thermoplastic gear tooth portion 24 formed on the periphery of second layer 14, and gear tooth portions 26 and 28 formed on the respective peripheries of plates 20 and 18. Each of the composite gear teeth in the composite gear has a composition like composite teeth 11 depicted FIG. 6.

Referring again to FIGS. 1 and 3, composite gear 10 also includes a hub 30, made from a thermoplastic material, which is adapted to receive a shaft (not shown). In one application of the present invention, the shaft is a cam shaft of an internal combustion engine, and gear 10 is a composite cam gear used in the engine. Of course, the present invention may be used in a wide variety of applications and is not limited to use as cam gears.

The present invention is particularly suitable for use as cam gears, however, because the torque forces imposed on the cam gear teeth are relatively moderate under normal operating conditions. However, the torque forces may increase substantially under emergency conditions, which cause the cam gear to be abruptly stopped.

FIG. 2 depicts one of the plates used to form body portion 16. In FIG. 2, plate 20 has a plurality of radially-extending teeth portions 32 on its periphery. Plate 20, as well as plate 18, also has a plurality of apertures 34 therein, the apertures being aligned with each other as depicted in FIG. 3. Apertures 34 are large enough to receive a molten thermoplastic material during the manufacturing of composite gear 10. The molten material used to form thermoplastic layers 12 and 14 passes through apertures 34 so that layers 12 and 14 become anchored to each other as well as to plates 18 and 20 of body portion 16. FIG. 3 best depicts the solidified thermoplastic material being disposed within apertures 34 and anchoring all the components together. Most of apertures 34 are disposed near the peripheries of plates 18 and 20. However, some of apertures 34 are disposed between hub 30 (FIG. 1) and the gear teeth to enable thermoplastic ribs 36 (FIG. 1) to be formed.

FIG. 4 depicts composite teeth 11 of the present invention meshing with mating teeth 38 of a mating gear during normal operation at normal loads. As depicted in FIG. 4, the outwardly extending thermoplastic portions 22a of thermoplastic teeth portions 22 engage the corresponding surfaces 40 of teeth 38 at normal loads, such that the metal portions of composite teeth 11 do not significantly engage surfaces 40. That is, the thermoplastic portions 22 and 24 of composite teeth 11 are not significantly compressed at normal loads. Gear teeth portions 22 and 24 extend outwardly approximately 0.0005 to 0.004 inches when compared to rigid teeth portions 26 and 28. Gear teeth portions 22 and 24 may extend outwardly by a larger distance, but then the composite gear must be made using a different manufacturing method than the one described herein.

At higher loads, the outwardly extending portions 22a of teeth portions 22 are in fact compressed at points 22b in FIG. 5. Under high load conditions, such as those which may occur upon an abrupt stopping of gear 10, portions 22a of teeth portions 22 are compressed due to the forces imposed upon these portions by mating teeth 38. Thermoplastic teeth portions 24 extend outwardly and are compressed in a similar manner as teeth portions 22. Under these high load conditions, the larger torque forces are absorbed by the rigid portions of composite gear teeth 11, namely the gear teeth portions 28 and 26 of plates 18 and 20 respectively. Thermoplastic teeth portions 22 and 24 are compressed and are free to bend out of the way so that the higher torque forces are absorbed by the metal gear teeth portions. Since the metal gear teeth portions generally absorb torque forces only under abnormal conditions, the composite gear teeth generate very little noise when mating with mating teeth 38 under normal operating conditions.

The thermoplastic material used in the composite gear is selected such that it only compresses under abnormal load conditions and bears the torque forces under normal operation conditions. Nylon is a preferred thermoplastic material for use in the present invention, although other materials may also be used.

FIGS. 7 through 10 relate to a second embodiment of the composite gear according to the present invention. The second embodiment differs from the first embodiment discussed above in several major respects. First, the thermoplastic gear tooth portions in the second embodiment extend outwardly from their respective first layer and second layer in the directions which are parallel to the longitudinal axis of the cam gear and the cam shaft which passes through the hub of the cam gear. The purpose of this feature is to allow the thermoplastic gear tooth portions to bend even to a greater degree upon the application of torque forces when compared to the first embodiment.

A second distinction between the second embodiment and the first embodiment is that the second embodiment has a plurality of radially-extending thermoplastic ribs disposed on the first layer and second layer to provide additional support for the thermoplastic gear teeth portions.

Figure 8:
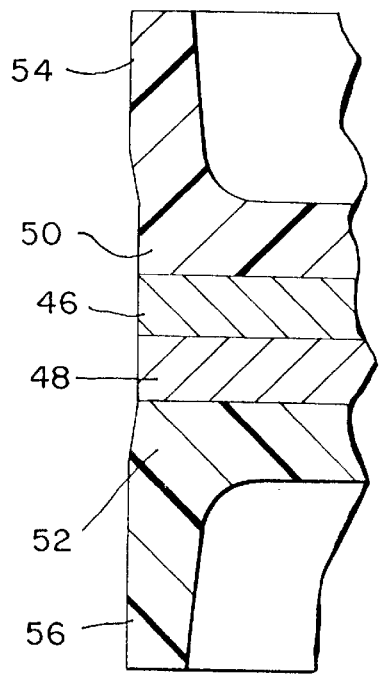
FIG. 8 is a cross-sectional view of a composite gear tooth according to the second embodiment, taken along line 8—8 of FIG. 7.
Figure 9:
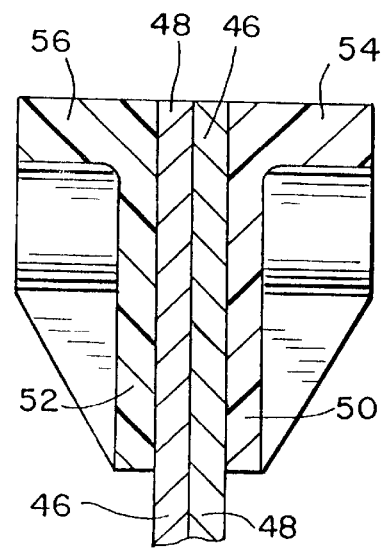
FIG. 9 is a cross-sectional view of the composite gear according to the second embodiment, taken along line 9—9 of FIG. 7.
Figure 10:
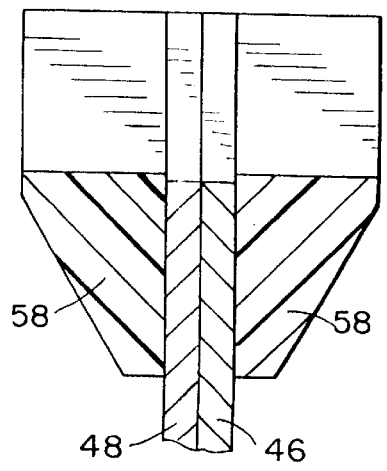
FIG. 10 is a cross-sectional view of the composite gear according to the second embodiment, taken along line 10—10 of FIG. 7.

FIG. 7 is an exploded view of a portion of a cam gear according to the second embodiment of the present invention. In FIG. 7, cam gear 42 has a plurality of composite gear teeth 44 disposed on its outer periphery. As best shown in FIGS. 8 and 9, each composite gear tooth is comprised of two stamped, metal plates 46 and 48, as well as a first layer 50 and a second layer 52, both comprised of a thermoplastic material such as nylon. Each of plates 46 and 48 has rigid gear teeth portions disposed on their respective outer peripheries, as best shown in FIG. 9.

Each of layers 50 and 52 has thermoplastic gear teeth portions 54 and 56 respectively disposed on their outer peripheries. Gear teeth portions 54 and 56 extend outward from their respective layers 50 and 56 in the axial direction, that is, in a direction parallel to the shaft (not shown) which is disposed within the hub of the cam gear (FIG. 1). Thermoplastic gear portions 54 and 56 also extend outwardly from the rigid gear teeth portions in the radial and circumferential directions, as discussed above in connection with the first embodiment.

The purpose of extending gear teeth portions 54 and 56 in the axial direction is to enable the gear teeth portions to further bend upon application of torque forces. Under unusually high torque forces, gear teeth portions 54 and 56 may more readily bend in the axial directions when compared to the first embodiment, thereby enabling the higher load forces to be borne by the rigid gear teeth portions of plates 46 and 48.

As also depicted in FIG. 7, the second embodiment includes a plurality of radially-extending ribs 58 which provide additional support to valley portions 60 of the thermoplastic gear teeth portions. Ribs 58 are preferably disposed on both first layer 50 and second layer 52, thereby supporting the valley portions of both the first layer and the second layer.

Figure 11:
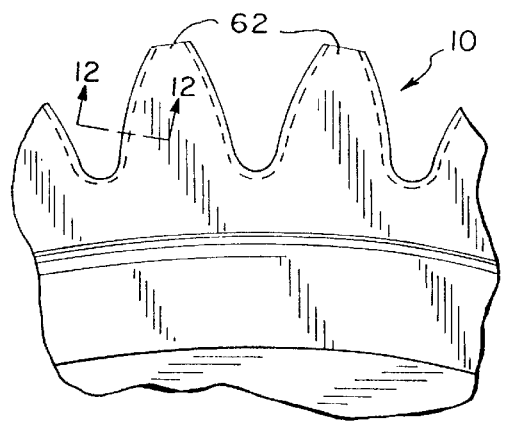
FIG. 11 is an exploded view of several gear teeth according to the present invention.
Figure 12:
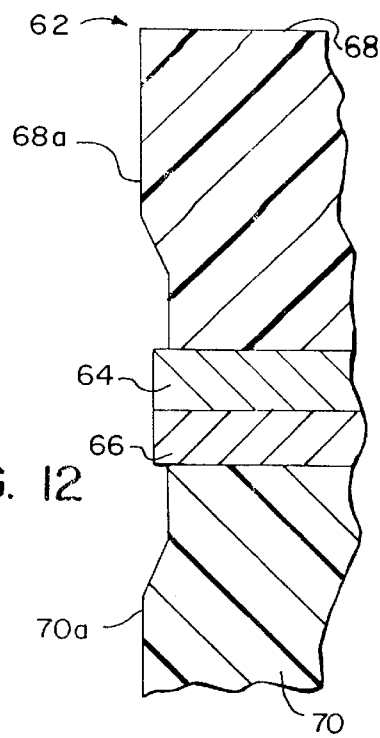
FIG. 12 is a cross-sectional view of one composite gear tooth, taking along line 12—12 of FIG. 11.

FIGS. 11 and 12 also depict composite gear teeth 62 according to the present invention. As best shown in FIG. 12, each of composite gear teeth 62 has two rigid gear tooth portions 64 and 66, a first layer 68 of a thermoplastic material, and a second layer 70 of the thermoplastic material. A different number of rigid teeth portions may be used, such as one, three or more. Each of the rigid gear teeth portions extends from a rigid plate or lamination, as discussed above. As best shown in FIG. 12, each of the thermoplastic gear tooth portions 68a and 70a extends in an outward circumferential direction when compared to rigid gear tooth portions 64 and 66.

The applicant has discovered that the composite gear of the present invention cannot be manufactured using standard tooling without overmolding rigid gear tooth portions 64 and 66 when layers 68a and 70a and thermoplastic gear tooth portions 68A and 70A are formed. Unless special tooling and techniques are used, the thermoplastic material will simply flow over the rigid gear tooth portion 64 and 66, thereby eliminating the advantage of the present invention, namely that the thermoplastic gear tooth portions extend radially and circumferentially outward to absorb forces during normal use of the gear. As may be appreciated from FIG. 12, the tool used to make the composite gear must itself have tool teeth with unique profiles to achieve the shape of teeth 62 on the composite gear.

Figure 13:
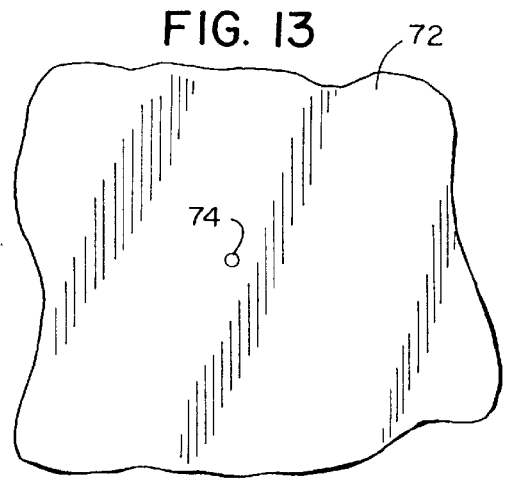
Figure 14:
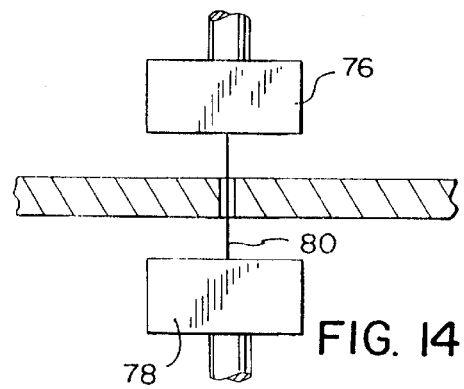
Figure 15:
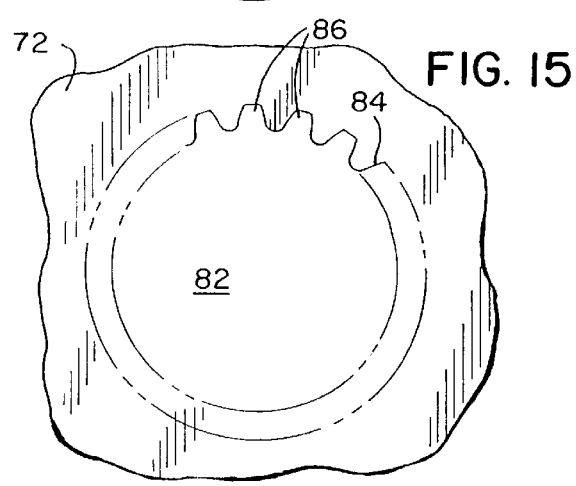

FIGS. 13 through 28 depict the method and apparatus used to manufacture this unique tooling. The process begins, as depicted in FIG. 13, with a plate 72 in which an aperture 74 is formed. As shown in FIG. 14, electric discharge machining apparatus is used in conjunction with the aperture. The electric discharge machining apparatus includes a first electrode 76, a second electrode 78, and a metal wire 80 connected between electrodes 76 and 78. As well known in the art, a current is passed through the wire and the wire is moved to form a cavity 82 (FIG. 15) that is partially defined by a surface 84 having a plurality of roughly-shaped tool teeth 86 therein.

Figure 16:
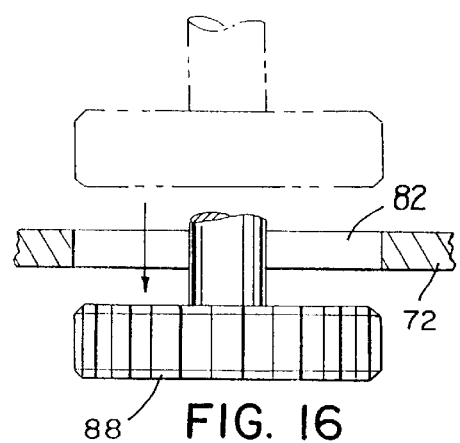

In the next step, depicted in FIG. 16, a graphite electrode 88 is passed through cavity 82 and plate 72 in a first direction. As depicted in FIG. 17, graphite electrode 88 is then retracted through cavity 82 in the reverse direction. FIG. 18 depicts electrode 88 being disposed within cavity 82, the electrode having an outer surface, with electrode teeth 88a thereon which have roughly the same shape as the roughly-shaped tool teeth 86. As shown in FIG. 18, each of the roughly-shaped tool teeth 86 has two opposed centering protrusions 90 extending from an outer surface 86a of tool teeth 86. The centering protrusions are used to center the rigid body portions of the composite gear during the gear manufacturing process, as more fully discussed below.

As best shown in FIG. 19, space 89 between tool 72 and electrode tooth 88a is very small near the base of tool tooth 86. On the other hand, space 91 between tool 72 and electrode tooth 88a is substantially larger in the vicinity of centering protrusions 90, as best depicted in FIG. 20.

To achieve the composite gear tooth profile depicted in FIG. 12, the teeth of tool 72 must have a corresponding profile. This tool tooth profile is created using the steps depicted and described below in connection with FIGS. 21 through 28.

The next step after step 17 is to orbit electrode 88 in a first or upper portion of tool cavity 82 to create a first side section 92 of the tool teeth. See FIG. 21. In the next step, depicted in FIG. 22, electrode 88 is then passed through cavity 82 and is orbited in a second or lower section of the cavity to create a second side section 94 of the tool teeth. FIG. 23 depicts graphite electrode 88 disposed between two adjacent tool teeth 86.

FIG. 24 is a side cross-sectional view, taken along line 24—24 of FIG. 23, depicting electrode tooth 88a in both the first or upper position (FIG. 21) and in the second or lower position (FIG. 22). When tool tooth 88a is in the upper position and is orbited as in FIG. 21, it creates first side section 92 of tool tooth 86. When electrode 88 is in the second position, it creates second side section 94 of tool tooth 86. The resulting profile of tool tooth 86 is that the tool tooth has two side sections 92 and 94, and a central section 96 therebetween which is larger in the circumferential direction by about 0.001 to 0.007 inches when compared to first and second sections 92 and 94 respectively. This tool tooth profile, consisting of sections 92, 94 and 96, is generally complimentary to the composite gear tooth profile depicted in FIG. 12.

As depicted in FIG. 25, there is a significant space between centering protrusion 90 on tool tooth 86 and electrode tooth 88a regardless of whether the electrode tooth is in the upper or lower position. Thus, the electrode does not change the shape of centering protrusions 90.

Figure 26:
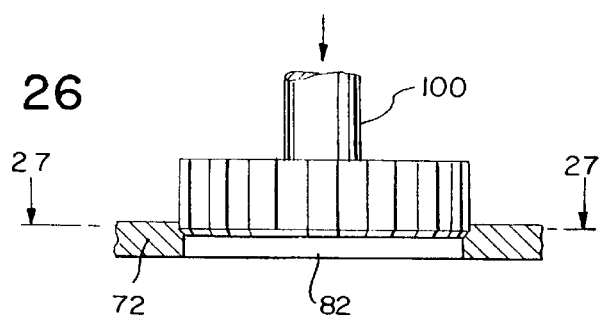
Figure 27:
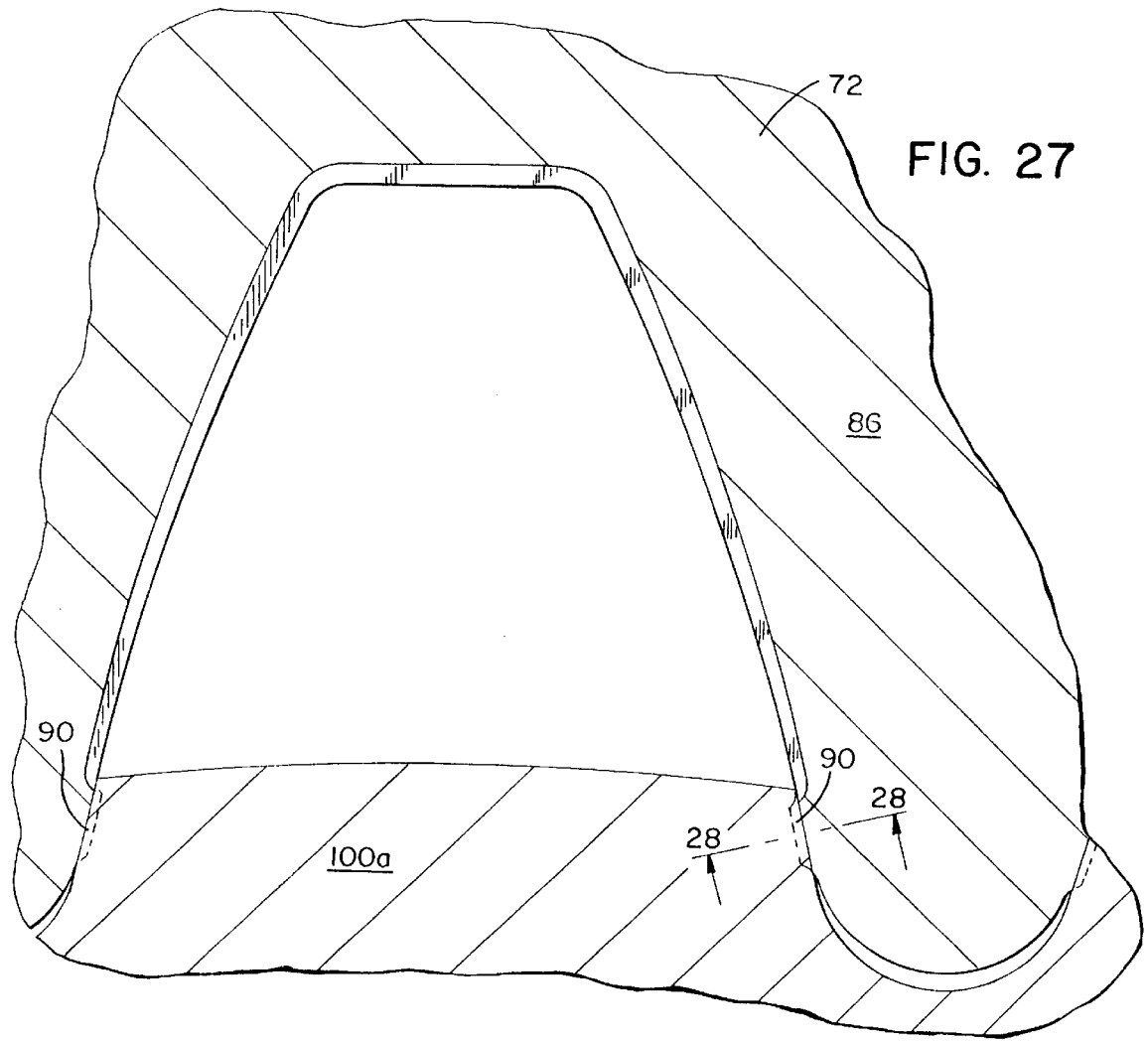
Figure 28:
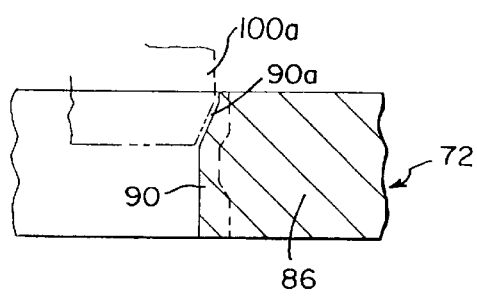

However, the shape of the centering protrusions is changed using a second graphite electrode 100, as depicted in FIGS. 26 through 28. In FIGS. 26 through 28, second graphite electrode 100 is lowered into tool cavity 82 so that truncated electrode tooth portions 100a engage centering protrusions 90 (FIGS. 27 and 28). As a result, the electrode, which is not orbited, creates guide surfaces 90a on centering protrusions 90 which are used to guide the rigid metal tooth portions into the tool cavity during the composite gear molding process, as discussed below. Thus, the tapered centering protrusions center and determine the exact position of the rigid body portions of the composite gear before molding to insure that the distance between the rigid gear teeth portions and the tool teeth portions prevents overmolding of the metal gear teeth portions when the thermoplastic material flows into the mold.

FIGS. 29 through 40 relate to the process used to mold the composite gear of the present invention.

In FIG. 29, the mold consists of a first mold section 102, a second mold section 104, and tool 72. The rigid body portions or laminations 65 and 67 are placed in tool 72, and are pushed into position by mold section 102. FIG. 30 depicts the mold in the closed position, with the rigid body portions in place. The rigid body portions are guided into place by tapered centering protrusions 90 (FIG. 31). As shown in FIG. 31, tapered centering protrusions 90 extend from the outer surface of tool teeth 86 and engage rigid tooth portions 64 and 66 to center the metal laminations. When properly centered, there is a gap 106 between about 0.0005 to 0.004 inches (0.002 inches being preferred) between rigid tooth portions 64 and 66 on the one hand and plate 72 or tool tooth portions 86 on the other hand, except near centering protrusions 90. This gap is more fully discussed below.

FIGS. 32, 32A, 34, 34A, 36, and 36A all depict the rigid body portions in the mold in an area distant from centering protrusions 90. FIGS. 33, 35, and 37 depict the position of the rigid body portions at the centering protrusions.

FIG. 32 is a cross-sectional side view of the rigid body portions disposed in cavity 82 of tool 72. Gap 106 is depicted in FIG. 32, and is more clearly shown in FIG. 32A. Gap 106 is the distance between the rigid body portions on the one hand and central portion 96 of tool tooth 86. As best shown in FIG. 32A, central section 96 is larger than side sections 92 and 94 (FIG. 32) of each tool tooth. In addition, the tool tooth profile has a transitional section 108 between side section 92 and central section 96, as well as a transitional section 110 between second side section 94 and central section 96 (FIG. 32). As shown in FIG. 32A, the surface of transitional section 108 is angled, forming an angle 111 of about 20 degrees with respect to a plane 112. Transitional section 110 similarly forms an angle of about 20 degrees with respect to a line 112. Again referring to FIG. 32A, central section 96 extends a distance 114 of about 0.004 inches in a circumferential direction further than first and second side sections 92 and 94 (FIG. 32).

As depicted in FIG. 33, rigid gear teeth portions 64 and 66 abut against centering protrusion 90 when the rigid gear body portions are placed in the mold. That is, there is no significant gap between the centering protrusions on the tool teeth and the rigid gear body portions 64 and 66 of the composite gear. Tapered surface 90a of centering protrusion 90 (FIG. 33) extends slightly less than the remainder of the centering protrusion. The rigid gear teeth portions are placed in the mold from the upward direction in FIG. 33, and are guided into place along surface 90a.

FIGS. 34 and 35 depict the next step in the molding process, at areas distant from and adjacent to the centering protrusions respectively. In FIG. 34, molten thermoplastic material flows on the two sides adjacent to rigid gear teeth portions 64 and 66 to create a first thermoplastic gear tooth portion 112 and a second thermoplastic gear tooth portion 114. However, the thermoplastic material is unable to flow in the relatively small gap 106 between central portion 96 of the tool gear teeth and rigid tooth portions 64 and 66 of the composite gear. Thus, overmolding of the rigid gear teeth portions is prevented.

FIG. 34A is an exploded view of FIG. 34 and more clearly depicts gap 106 between central tool tooth portion 96 on the one hand and rigid gear teeth portions 64 and 66 on the other hand. As depicted in FIG. 34A, there is no gap between the molten thermoplastic material and tool tooth 86 on opposite sides of rigid gear teeth portions 64 and 66.

In the area near the centering protrusion 90, as depicted in FIG. 35, overmolding is prevented because there is no significant gap between centering protrusion 90 on the one hand and rigid gear teeth portions 64 and 66 on the other hand.

FIGS. 36 and 37 depict the molding process after the thermoplastic material has solidified and has shrunk away from the tool. FIG. 36 is a cross-sectional view in an area distant from the centering protrusions, whereas FIG. 37 is a side cross-sectional view near the centering protrusion.

In FIGS. 36 and 36A, thermoplastic layers 112 and 114 have shrunk away from side sections 92 and 94 respectively of tool 72, such that there is now a gap of about 0.002 inches between thermoplastic tooth portions 112 and 114 on the one hand and side sections 92 and 94 on the other hand. Gap 106 between central portion 96 and rigid gear teeth portions 64 and 66 remains the same. However, gaps 116 and 118, disposed on opposite sides of gap 106 and adjacent to gap 106, are larger than gap 106 by a distance 107 of about 0.002 inches, and are on the order of about 0.004 inches.

As depicted in FIG. 37, there is no significant gap between centering protrusion 90 on the one hand and rigid gear teeth portions 64 and 66 on the other hand. However, there is a gap 120 of about 0.002 inches between thermoplastic tooth portions 112 and 114 on the one hand and tool tooth 86 on the other hand.

Figure 38:
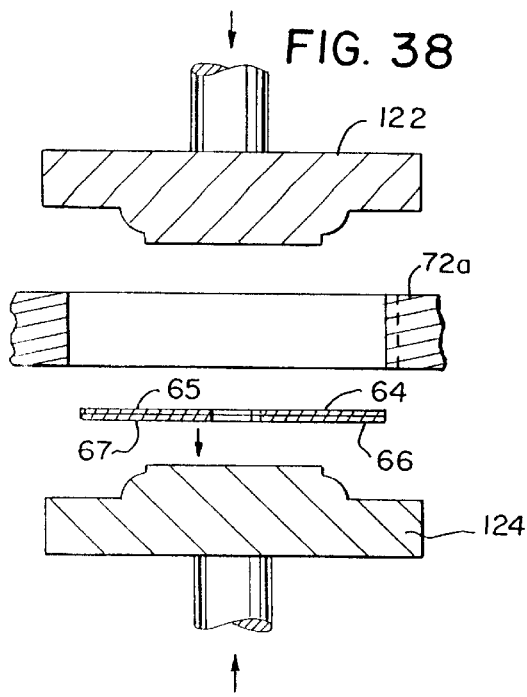
Figure 39:
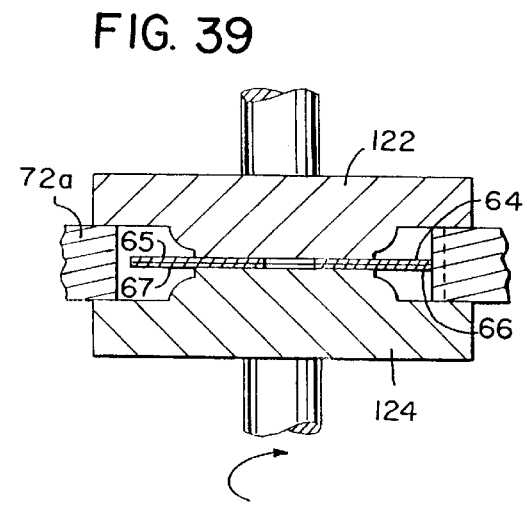
Figure 40:
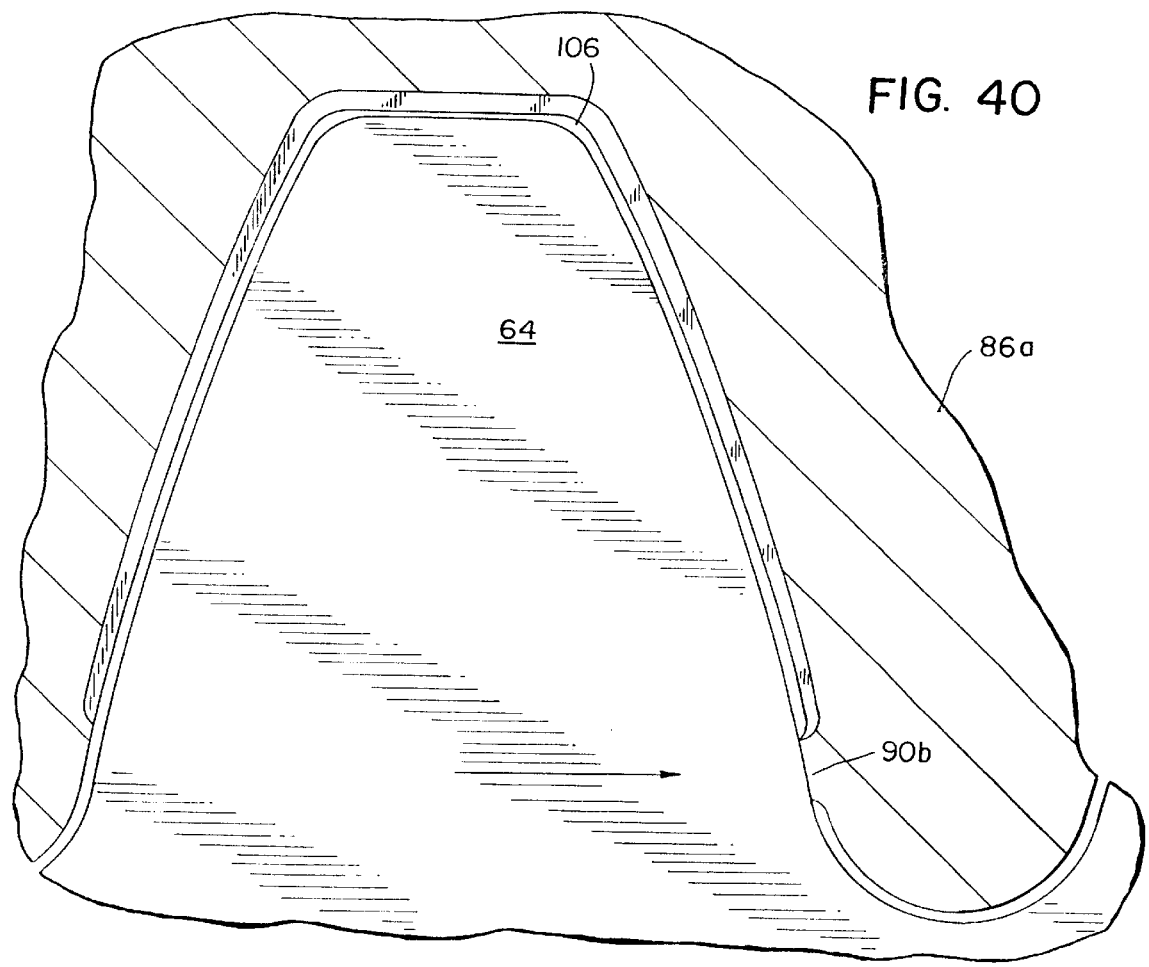

FIGS. 38 through 40 relate to a second embodiment of a composite gear manufacturing method according to the present invention. FIG. 38 depicts the mold assembly according to the second embodiment in the open position. In FIG. 38, the mold assembly consists of an upper mold section 122, a lower mold section 124, and a tool 72a. Tool 72a is similar to tool 72, except that in tool 72a each tool tooth 86a (FIG. 40) may have only a single centering protrusion 90b instead of the two centering protrusions in the first embodiment. Of course, two centering protrusions may be used. Also, centering protrusions 90b are not tapered as in the first embodiment.

Referring again to FIG. 38, rigid body portions 65 and 67 are placed on second mold section 124. The mold is closed as before, as depicted in FIG. 39. The relative position of the mold with respect to rigid body portions 65 and 67 is then changed by rotating either mold sections 122 and 124, or by rotating body portions 65 and 67 within the closed mold. In either event, body portions 65 and 66 are rotated until they abut centering protrusions 90b. In this way, gap 106 between rigid tooth portions 64 and 66 on the one hand and tool 72a on the other hand is precisely determined to prevent overmolding of rigid tooth portions 64 and 66 during the molding process.

Although the gap sizes and distances provided herein, such as gap 106, are preferred, it is understood that other gap sizes and distances may be used without departing from the spirit and scope of the present invention. Specifically, gap 106, between the rigid body portions on the one hand and the tool on the other hand, should be of a size as to prevent overmolding of the rigid metal portions during the molding process. The gap size may vary depending upon the nature of the thermoplastic material as well as other factors. Also, the extent to which the thermoplastic portions of the composite gear teeth are larger in the circumferential and radial directions when compared to the rigid metal teeth portions may also vary from the values provided herein without departing from the spirit and scope of the present invention. It is understood that the purpose of the larger thermoplastic tooth portions of the composite teeth is to absorb relatively small torque forces during normal operation of the apparatus, while allowing the thermoplastic portions to be compressed during abrupt starts and stops so that the main gear engages the rigid tooth portions. The actual values may differ depending upon a number of factors, including the applied torques, materials used, and other factors.

Therefore, the above description and the drawings relate to certain embodiments of the present invention, it being understood that alternate embodiments may be used without departing from the spirit and scope of the present invention. Therefore, the invention is to be limited only by the following claims.

What is claimed is:

1. A tool used to manufacture a composite gear having a plurality of gear teeth, said gear teeth being formed from at least one rigid body and two opposed layers of a thermoplastic material, said tool comprising:

a plate;

a cavity in said plate, said cavity being partially defined by a surface of said plate, said surface defining a plurality of tool teeth, two adjacent tool teeth being used to form one of said gear teeth; and at least one centering protrusion, defined in said surface, that is used to center said rigid body in said cavity.

2. The tool of claim 1, wherein said protrusion extends from a tool tooth.

3. The tool of claim 2, wherein said at least one protrusion includes a plurality of protrusions, and wherein two of said protrusions extend from opposite sides of the same tool tooth.

4. The tool of claim 3, wherein each of said centering protrusions extends from a tool tooth.

5. The tool of claim 1, wherein said protrusion has a tapered surface that guides said rigid body into a desired position.

6. The tool of claim 1, wherein the distance between said rigid body and said tool teeth is between 0.0005 to 0.004 inches when said rigid body is centered in said cavity, except near said at least one protrusion.

7. The tool of claim 1, wherein at least some of said tool teeth have a central section and two side sections on opposite sides of said central section, and wherein said at least some tool teeth are shaped such that their respective central sections are larger in a circumferential direction than their side sections.

8. The tool of claim 1, wherein said central sections are between 0.001 to 0.007 inches larger than said side sections in said circumferential direction.

* * * * *